(12) United States Patent
Turner

(10) Patent No.: US 12,201,243 B2
(45) Date of Patent: Jan. 21, 2025

(54) STAND MIXER APPLIANCE WITH ROTATING HEAD AND MOVABLE STAND

(71) Applicant: Haier US Appliance Solutions, Inc., Wilmington, DE (US)

(72) Inventor: Jeremy Michael Turner, Taylorsville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 512 days.

(21) Appl. No.: 17/568,834

(22) Filed: Jan. 5, 2022

(65) Prior Publication Data

US 2023/0210309 A1 Jul. 6, 2023

(51) Int. Cl.
A47J 43/044 (2006.01)
A47J 43/07 (2006.01)

(52) U.S. Cl.
CPC ......... A47J 43/044 (2013.01); A47J 43/0711 (2013.01); *A47J 2043/04463* (2013.01)

(58) Field of Classification Search
CPC ............ A47J 2043/04481; A47J 43/044; A47J 43/0711
See application file for complete search history.

(56) References Cited

U.S. PATENT DOCUMENTS

| 1,733,945 | A | * | 10/1929 | Dehuff | ................. | B01F 27/805 |
| | | | | | | 414/420 |
| 2,181,079 | A | | 11/1939 | Dehuff | | |
| 5,895,196 | A | | 4/1999 | Forsyth | | |
| 10,098,505 | B2 | * | 10/2018 | Roberts | ................. | B01F 27/807 |
| 10,799,072 | B2 | | 10/2020 | Ambrose | | |

FOREIGN PATENT DOCUMENTS

| AU | 2011250731 B2 | 10/2015 |
| DE | 19926045 C2 | 6/2003 |
| EP | 0399878 B1 | 8/1993 |

* cited by examiner

*Primary Examiner* — Elizabeth Insler
(74) *Attorney, Agent, or Firm* — Dority & Manning, P.A.

(57) ABSTRACT

A stand mixer is provided having a pivotable head and a sliding stand for receipt of a bowl or other container. The head and bowl stand are pivotally linked such that as the head pivots an axis, the bowl stand moves simultaneously along a vertical direction. A plurality of linkages may be connected between the head and bowl stand to provide for such simultaneous movement.

18 Claims, 7 Drawing Sheets

STAND MIXER APPLIANCE WITH ROTATING HEAD AND MOVABLE STAND

FIELD OF THE INVENTION

The present subject matter relates generally to appliances and more particularly to stand mixers.

BACKGROUND OF THE INVENTION

Stand mixers generally include a bowl and a mixing device. The mixing device is attached, sometimes removably, with a head. The head is attached to a base and the base supports or holds the bowl in place during mixing. A motor may be placed in the stand mixer to rotate the mixing device. Mixing devices may include beaters, whisks, and dough hooks, which are often interchangeable and removably attachable to the head of the mixer. The bowl may also be removable, as such aids in cleaning and removing mixed ingredients from the bowl.

The mixing device typically reaches into the bottom of the bowl in order to effectively mix ingredients therein. In order to remove the bowl from the stand mixer, some may have a head that can be moved so as to lift the mixing device out of the bowl. However, depending on factors such as the size of the bowl or the size of the mixing devices, there may not be enough clearance to facilitate ready removal of the bowl from the base. Adding ingredients to the bowl may also be awkward or delicate due to lack of space between the mixing device and the edge of the bowl needed to add ingredients without spillage.

Accordingly, a stand mixer with the ability to have more clearance between the bowl and the mixing device would be desirable. Such a stand mixer that allows for easier removal of the bowl or the mixing device due to increased clearance between the bowl and the mixing device would also be desirable.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a stand mixer is provided. The stand mixer can define vertical, lateral, and transverse directions. The stand mixer may include a base, a head, a motor, and a bowl. The head may be pivotably mounted to the base and may be pivotable about a head pivot axis. The head pivot axis can be parallel to the lateral direction and can have a fixed position relative to the base. The bowl stand may be slidably mounted to the base. The head and bowl stand can be pivotably linked such that the head pivots about the head pivot axis simultaneously with movement of the bowl stand along the vertical direction.

In another exemplary aspect of the present disclosure, a stand mixer is provided. The stand mixer can define vertical, lateral, and transverse directions. The stand mixer may include a base, a head, a motor, and a bowl. The head may be pivotably mounted to the base and may be pivotable about a head pivot axis. The head pivot axis can be parallel to the lateral direction and can have a fixed position relative to the base. The bowl stand may be slidably mounted to the base and may be moveable along the base in the vertical direction. The stand mixer can further include a plurality of linkages. The plurality of linkages may be connected between the head and to the bowl stand. The head and bowl stand can be pivotably linked through the plurality of linkages such that the head pivots about the head pivot axis simultaneously with movement of the bowl stand along the vertical direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Use of the same of similar reference numerals in the figures denotes the same or similar features unless the context indicates otherwise.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

The terms "coupled," "fixed," "attached to," and the like refer to both direct coupling, fixing, or attaching, as well as indirect coupling, fixing, or attaching through one or more intermediate components or features, unless otherwise specified herein.

The present invention advantageously provides a mixer appliance that may provide more clearance for a user to e.g., install and remove attachments and manipulate ingredients placed in a bowl or other container positioned on the appliance. The additional space may also allow for easier removal of the bowl or container from the appliance.

Figure 1:
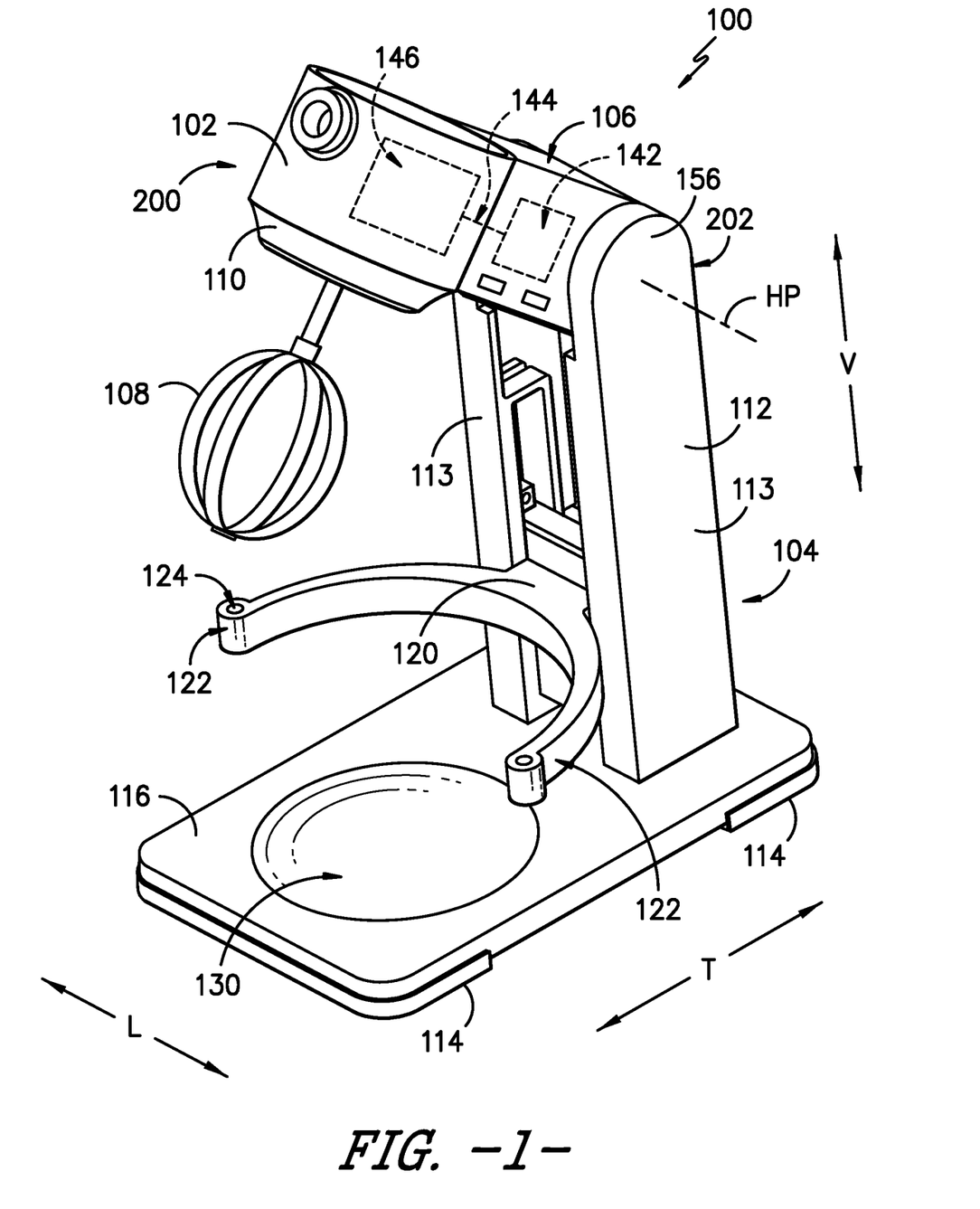
FIG. 1 provides a perspective view of an exemplary embodiment of a stand mixer appliance of the present disclosure.

The figures depict an exemplary stand mixer appliance 100 that may be configured in accordance with various aspects of the present disclosure. It should be appreciated that the invention is not limited to any particular style, size, model, or shape for stand mixer appliance 100. The exemplary embodiment in FIG. 1 is for illustrative purposes only. For example, appliance 100 may have different shapes and appearance for one or more parts, different motor and gear configurations, and other differences while remaining within the scope of the claimed subject matter.

Figure 2:
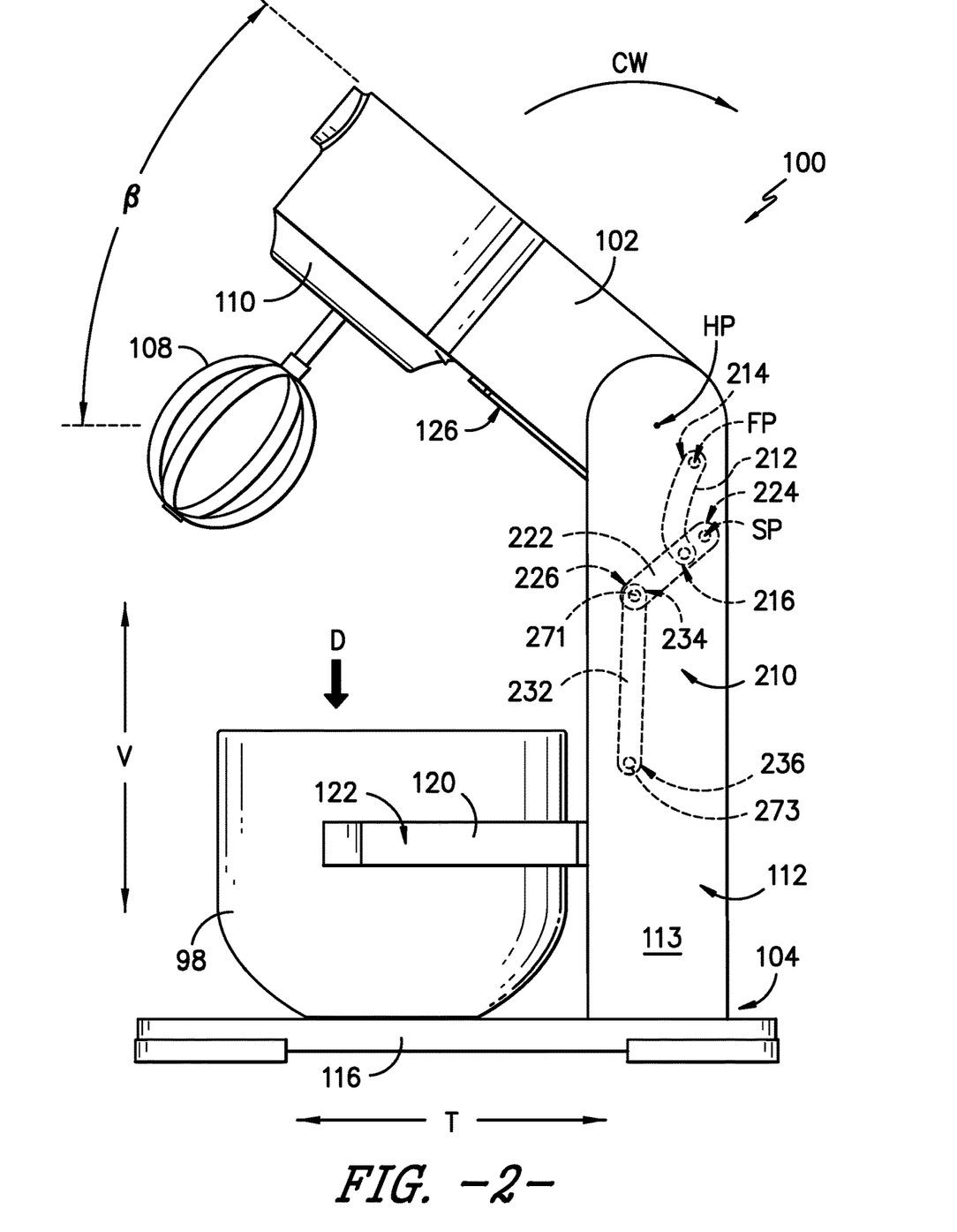
FIG. 2 provides a side elevation view of the exemplary stand mixer of FIG. 1 with an exemplary head raised and an exemplary bowl stand lowered.
Figure 3:
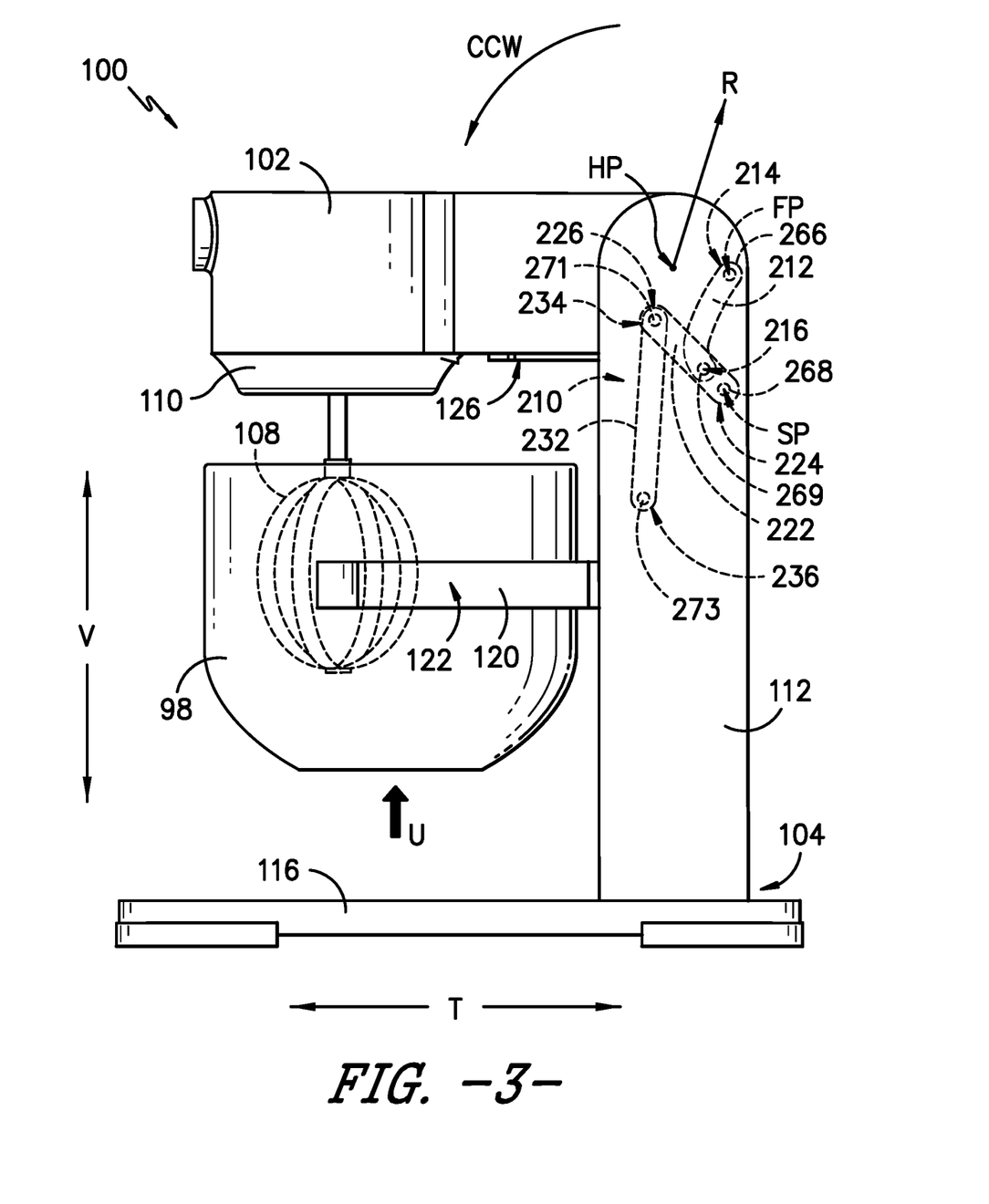
FIG. 3 provides a side elevation view of the exemplary stand mixer of FIG. 1 with an exemplary bowl stand shown in a raised position.
Figure 4:
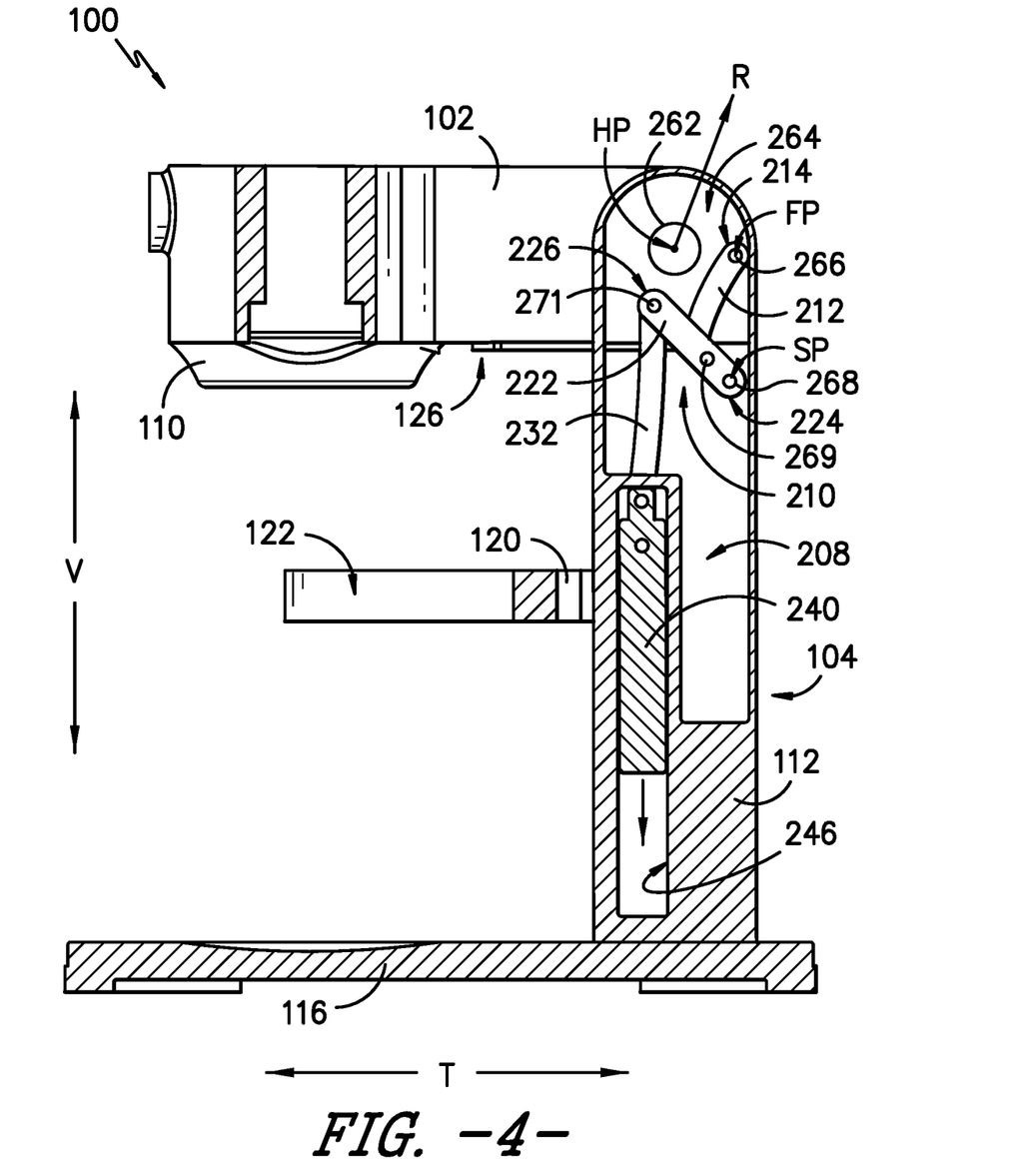
FIG. 4 is a cross-sectional view of the same.
Figure 5:
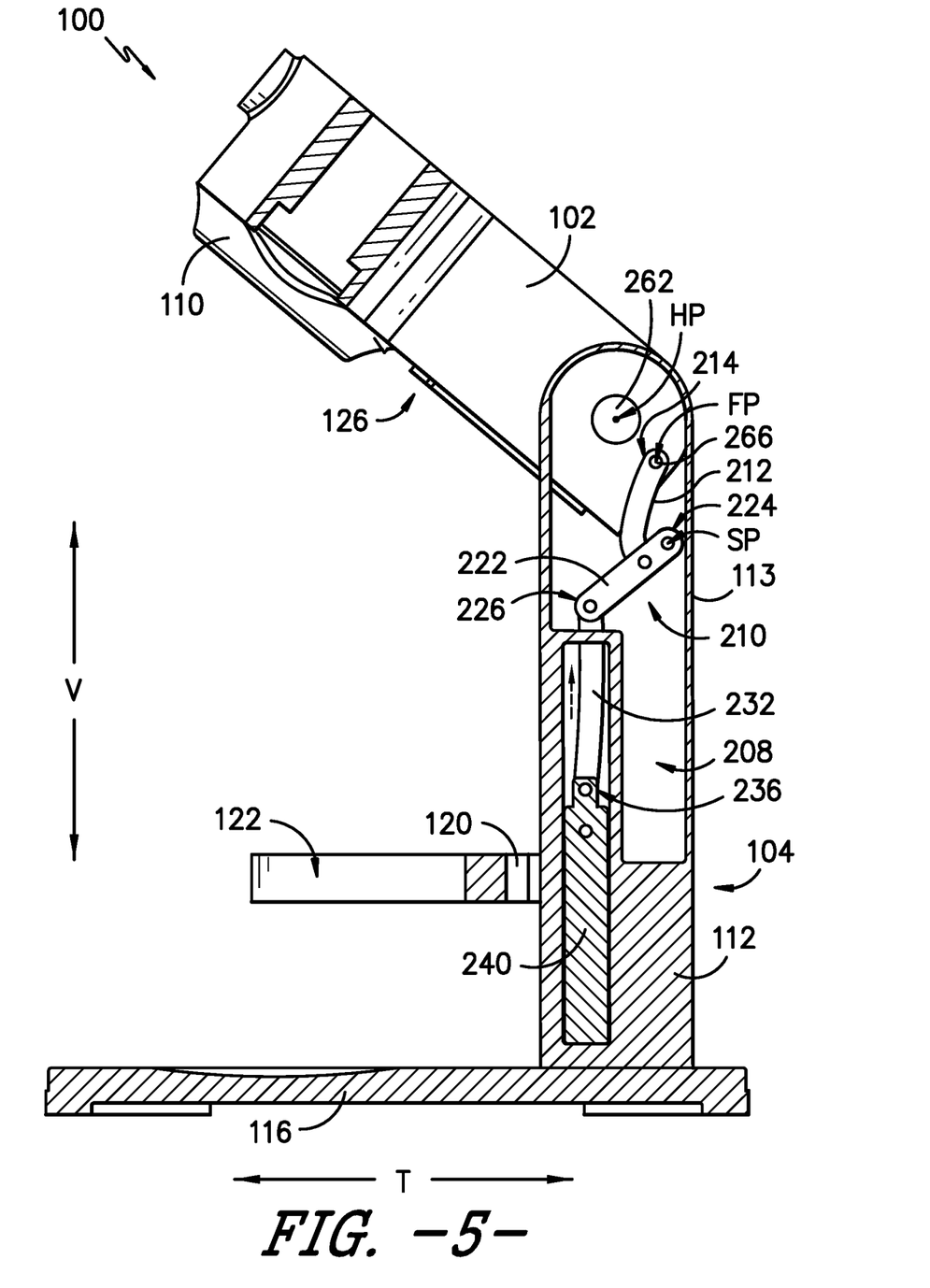
FIG. 5 provides a cross-sectional, side elevation view of the exemplary stand mixer of FIG. 1 with the exemplary head raised and the exemplary bowl stand lowered.
Figure 6:
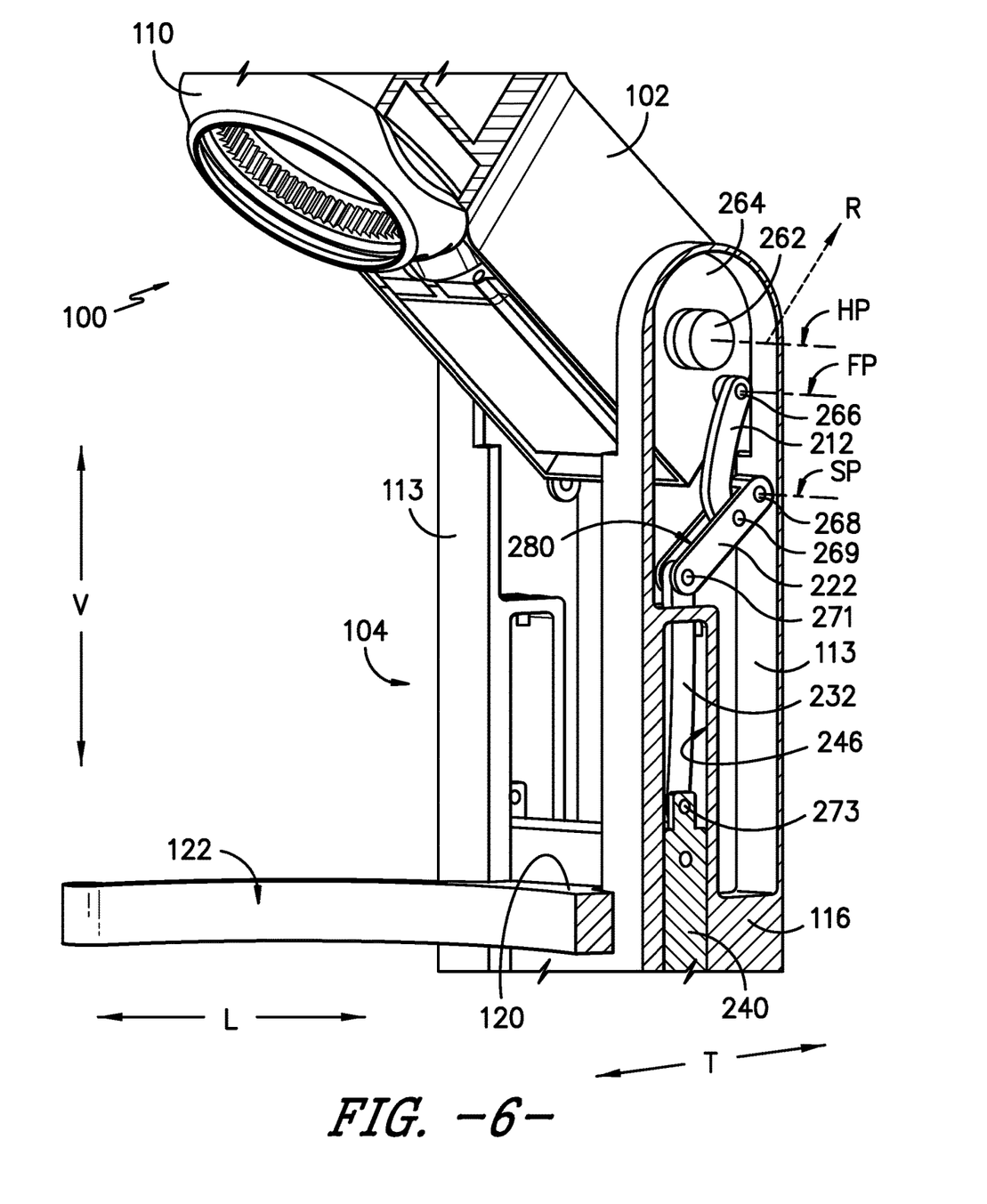
FIG. 6 provides a cross-sectional, front perspective view of a portion of the exemplary stand mixer of FIG. 1.
Figure 7:
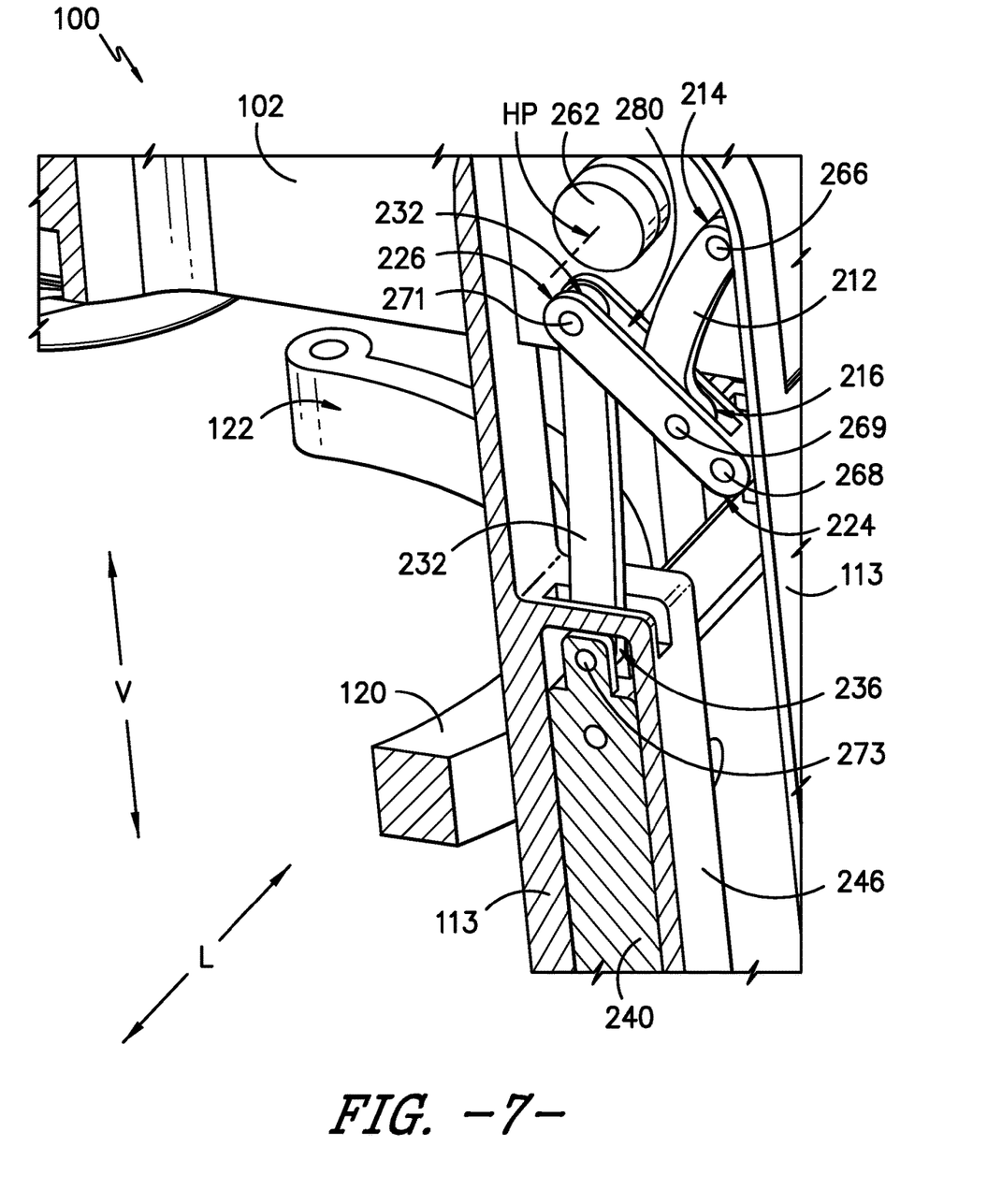
FIG. 7 is a cross-sectional, rear perspective view of a portion of the exemplary stand mixed for FIG. 1.

Exemplary stand mixer 100 is movable between a preparatory position (FIGS. 1, 2, 5, and 6) and a mixing position (FIGS. 3, 4, and 7). The preparatory position allows for the addition of substances to a bowl 98 (FIGS. 2 and 3) or other container—as well as the attachment to (or replacement of) a rotating attachment 108 to attachment support 110. Mixing position allows for rotating attachment 108 to rotate within bowl 98 so as to blend, whisk, or otherwise mechanically manipulate one or more ingredients therein. Preparatory position and mixing position will be described in more detail below.

With reference for FIGS. 1 through 3, for the particular embodiment shown, the mixer includes a head 102 and a base 104 with a casing 106 surrounding the head 102. Stand mixer appliance 100 extends between head 102 and base 104 in a vertical direction V, across head 102 in a lateral direction L, and from a front 200 to a back 202 in a transverse direction T. The vertical direction V, lateral direction L, and transverse direction T are perpendicular to one another.

Head 102 is pivotally mounted to base 104 and extends transversely between front 200 and back 202 of stand mixer appliance 100 when in the down position shown in FIG. 1. For this embodiment, base 104 includes upright support 112 and a horizontal base member 116. As shown, upright support 112 extends vertically from horizontal base member 116 and horizontal base member 116 extends transversely in front of upright support 112. Although shown as a pair of vertically extending arms 113, upright support 112 could be constructed as a single or unitary component as well.

Horizontal base member 116 includes a bowl seat 130 that may be rotatable about a vertical axis. In some embodiments, bowl seat 130 may be concave, grooved, or otherwise shaped to accept bowl 98. As shown, base 104 further includes base feet 114 located underneath horizontal base member 116.

Upright support 112 includes a bowl stand 120 that extends transversely out from upright support 112, vertically above horizontal base member 116. Bowl stand 120 is slidably mounted to base 104 and movable up and down along vertical direction V as will further described. Bowl stand 120 includes a set of bowl arms 122 configured to hold a bowl 98 or other container underneath rotating attachment 108. In some embodiments, and as shown in FIG. 1, a set of bowl arm holes 124 are defined by bowl arms 122. Bowl arm holes 124 may be configured to accept e.g., rods (not shown) for removably attaching the bowl to the bowl arms 122 during mixing operations. In some embodiments, other attachment mechanisms may be used to removably attach bowl to bowl arms 122, as known in the art. Other shapes and constructions may be used for bowl stand 120 as well.

Head 102 includes an attachment support 110. A motor 142 is disposed within head 102 and enclosed by casing 106. Attachment support 110 is located on a lower portion or underside 126 of head 102 and forward of upright support 112 along transverse direction T. A rotating attachment 108 is selectively removable from attachment support 110. Drivetrain 144 connects motor 142 with one or more gears 146 for causing rotation of attachment 108. Gears 146 may allow for selection by the user of different rotating speeds for attachment 108. Appliance 100 may include one or more controls for operations such as selectively powering motor 142, choosing the speed of rotation for attachments 108, and other features. In certain embodiments, attachment support 110 may accept more than one attachment 108. Various types of attachments 108 may be used including e.g., whisks, paddles, dough hooks, beaters, and others for purposes of mixing ingredients within a bowl or other container supported by base 104. During use, attachment support 110 may rotate attachment 108 in a circular or planetary fashion. Spinning in a planetary fashion, as used herein, includes spinning both in a circular fashion and rotating about an axis that moves in a circular fashion. In some embodiments, motor 142 may be disposed within base 104, including within upright support 112.

Appliance 100 may be configured so that rotating attachment 108 is non-removable from attachment support 110 when stand mixer attachment 108 is in a mixing position shown in FIGS. 3, 4, and 7. Conversely, rotating attachment 108 may be removable from attachment support 110 when appliance 100 is in a preparatory position shown in FIGS. 1, 2, 5, and 6. Other configurations for removal of attachments may be used as well.

With reference to the exemplary embodiment of stand mixer appliance 100, head 102 and bowl stand 120 are pivotally linked such that head 102 pivots about a head pivot axis HP simultaneously with movement of bowl stand 120 up and down a long vertical direction V. More particularly, as shown in FIG. 2, as head 102 is pivoted by a user in the direction of arrow CW, bowl stand 120 simultaneously moves vertically downward in the direction of arrow D. In the preparatory position of FIG. 2, more clearance is available for manipulation of attachment 108 and ingredients in bowl 98 than if the position of bowl 98, head 102, or both, were fixed. Conversely, as shown in FIG. 3, as head 102 is pivoted by a user in the direction of arrow CCW, bowl stand 120 simultaneously moves vertically upward in the direction of arrow U. For this exemplary embodiment, head 102 can pivot back and forth in the amount of angle β (FIG. 2) between the preparatory position of FIG. 2 and the mixing position of FIG. 3.

Head pivot axis HP lies within an axle 262 (FIG. 4) supported on upright support 112 near its top 156. For example, upright support 112 may include pockets or recesses into which axle 262 is received and can rotate within. Axle 262 and axis HP extend through head 102 near its back 202 where head 102 is pivotally mounted to base 104. Head pivot axis HP is parallel to lateral direction L and has a fixed position relative to base 104. For this embodiment, head pivot axis HP is located near the top of upright support 112.

With reference now to FIGS. 2 through 7, head 102 and bowl stand 120 are pivotally linked through a plurality of linkages 210 located in a linkage cavity 208 within upright support 112. While linkages 210 are shown only along one side of appliance 100, it should be understood that the plurality of linkages 210 could be duplicated along both sides of appliance 100 as well. Alternatively, the linkages could be positioned at the center of appliance 100 between arms 113 of upright support 112. The present invention is not necessarily limited to the particular shape or thickness of the linkages shown.

Plurality of linkages 210 includes a first linkage 212 having a first end 214 and a second end 216. For this particular embodiment, first linkage 212 is curved between first end 214 and second end 216. First end 214 is pivotally attached to a rear portion 264 of head 102 using an axle 266. A first linkage pivot axis FP is defined by axle 266. First linkage pivot axis FP is offset along a radial direction R from head pivot axis HP and is located at a fixed position on head 102. Accordingly, as head 102 rotates between the preparatory and mixing positions previously described, first end 214, axle 266, and first link pivot axis FP rotate about pivot axis HP while maintaining fixed distance therefrom along radial direction R. During such rotation of head 102, first linkage 212 pivots about first linkage pivot axis FP and head pivot axis HP remains between first link pivot axis FP and support 110 where one or more attachments 108 may be connected to appliance 100.

The plurality of linkages 210 also includes a second linkage 222 having a first end 224 and a second end 226. For this particular embodiment, second linkage 222 is straight between first end 224 and second end 226. First end 224 is pivotally attached to upright support 112 of base 104 using an axle 268. A second linkage pivot axis SP is defined by axle 268. Second linkage pivot axis SP is parallel to lateral direction L and has a fixed position on base 104 and is located vertically lower than head pivot axis HP. Second linkage is 222 is pivotally attached to second end 216 of first linkage 212 using an axle 269. Axle 269 is located at a discrete position along second linkage 222 between its first end 224 and second end 226. As head 102 rotates between the preparatory and mixing positions previously described, second ends 216, 226 and axle 269 rotate about second linkage pivot axis SP.

Plurality of linkages 210 also includes a third linkage 232 having a first end 234 and a second end 236. For this particular embodiment, third linkage 232 is straight between first end 234 and second end 236. First end 234 is pivotally connected with second end 226 of second linkage 222 using an axle 271. Second end 236 is pivotally connected with a sled 240 using another axle 273. Sled 240 could be an integral part of bowl stand 120 or connected therewith. As head 102 rotates between the preparatory and mixing positions previously described, first end 234 of third linkage 232 rotates about second linkage pivot axis SP. During such rotation, second end 236 and axle 273 are constrained to move vertically up and down with sled 240 and bowl stand 120.

Sled 240 is constrained by base 104 to movement up and down (arrows U and D) along a predetermined path created by one or more tracks 246. For this embodiment, tracks 246 are vertically extending openings or channels provided by one or more arms 113 of upright supports 112. The rotation of head 102 about head pivot axis HP is translated by plurality of linkages 310 to sled 240 to cause its vertical movement within tracks 246—either up or down depending upon whether head 102 is being raised or lowered. Because sled 240 is connected with, or an integral part of, bowl stand 120—rotation of head 102 raises or lowers bowl 98 or another container resting on stand 120 between the preparatory position and the mixing position. For example, rotation of head 102 causes movement of sled 240 within the predetermined path so as to raise or lower the bowl stand.

As shown in FIGS. 6 and 7, second linkage 222 is constructed from dual components or links defining a slot 280 into which the ends of first linkage 212 and third linkage 232 are rotatably received. However, second linkage 222 could be constructed from a single link. The present invention is not limited to the particular plurality or configuration of first, second, and third linkages shown. As will be understood by one of ordinary skill in the art using the teachings disclosed herein, other configurations of the linkages may be used as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stand mixer defining vertical, lateral, and transverse directions, the stand mixer comprising:
   a base;
   a head pivotably mounted to the base and pivotable about a head pivot axis that is parallel to the lateral direction and has a fixed position relative to the base;
   a motor configured for driving one or more attachments; and
   a bowl stand slidably mounted to the base,
   wherein the head and bowl stand are pivotally linked such that the head pivots about the head pivot axis simultaneously with movement of the bowl stand along the vertical direction.

2. The stand mixer of claim 1, comprising:
   a first linkage comprising a first end pivotably attached to the head and pivotable about a first linkage pivot axis that is parallel to the lateral direction, has a fixed position on the head and is offset along a radial direction from the head pivot axis;
   a second linkage comprising a first end pivotally attached to the base and pivotable about a second linkage pivot axis that is parallel to the lateral direction and has a fixed position relative to the base, the second linkage also pivotably connected to the first linkage, the second linkage having a second end; and
   a third linkage comprising a first end pivotably connected to the second linkage and connected with the bowl stand.

3. The stand mixer of claim 2, wherein the third linkage comprises a second end that is constrained to movement up and down along the vertical direction only.

4. The stand mixer of claim 2, wherein the third linkage is pivotably connected to the second end of the second linkage.

5. The stand mixer of claim 2, wherein the base further comprises an upright support to which the head is pivotably mounted, and wherein the base further comprises a sled connected with the bowl stand and movable up and down within a track located within the upright support, the sled pivotably attached to the third linkage.

6. The stand mixer of claim 5, wherein the base further comprises an upright support to which the head is pivotably mounted, and wherein the base further comprises a sled connected with the bowl stand and movable up and down within one or more tracks located along the upright support, the sled pivotably attached to the third linkage.

7. The stand mixer of claim 1, further comprising a plurality of linkages connected between the head and the bowl stand.

8. The stand mixer of claim 1, further comprising a sled positioned in the base and connected with the bowl stand, the sled constrained by the base to movement back and forth along a predetermined path within the base, the sled connected by a plurality of linkages with the head such that rotation of the head causes movement of the sled within the predetermined path so as to raise or lower the bowl stand.

9. The stand mixer of claim 8, the base further comprising one or more tracks located within the base, wherein the predetermined path is provided by the one or more tracks.

10. The stand mixer of claim 2, wherein the first linkage is connected to the second linkage at a discrete position along the second linkage, the discrete position located in between the first end and second end of the second linkage.

11. The stand mixer of claim 10, wherein the first linkage is curved between the first end and the second end of the first linkage.

12. The stand mixer of claim 2, wherein the second linkage and the third linkage are straight linkages, and the first linkage is a curved linkage.

13. A stand mixer defining vertical, lateral, and transverse directions, the stand mixer comprising:
 a base;
 a head pivotably mounted to the base and pivotable about a head pivot axis that is parallel to the lateral direction and has a fixed position relative to the base;
 a motor configured for driving one or more attachments;
 a bowl stand slidably mounted to the base, the bowl stand moveable along the base in the vertical direction; and
 a plurality of linkages connected between the head and to the bowl stand,
 wherein the head and bowl stand are pivotably linked through the plurality of linkages such that the head pivots about the head pivot axis simultaneously with movement of the bowl stand along the vertical direction.

14. The stand mixer of claim 13, the plurality of linkages comprising:
 a first linkage comprising a first end pivotably attached to the head and pivotable about a first linkage pivot axis that is parallel to the lateral direction, has a fixed position relative to the head and is offset along a radial direction from the head pivot axis;
 a second linkage comprising a first end pivotally attached to the base and pivotable about a second linkage pivot axis that is parallel to the lateral direction and has a fixed position relative to the base, the second linkage also pivotably connected to the first linkage, the second linkage having a second end; and
 a third linkage comprising a first end pivotably connected to the second linkage and connected with the bowl stand.

15. The stand mixer of claim 14, wherein the third linkage comprises a second end that is constrained to movement up and down along the vertical direction only.

16. The stand mixer of claim 14, wherein the third linkage is pivotably connected to the second end of the second linkage.

17. The stand mixer of claim 14, wherein the base further comprises an upright support to which the head is pivotably mounted, and wherein the base further comprises a sled connected with the bowl stand and movable up and down within a track defined by the upright support, the sled pivotably connected with the third linkage.

18. The stand mixer of claim 17, wherein the base further comprises an upright support to which the head is pivotably mounted, and wherein the base further comprises a sled connected with the bowl stand and movable up and down within a pair of tracks defined along opposing sides of the upright support, the sled pivotably connected with the third linkage.

* * * * *